United States Patent [19]

Weil et al.

[11] Patent Number: 5,355,668
[45] Date of Patent: Oct. 18, 1994

[54] CATALYST-BEARING COMPONENT OF GAS TURBINE ENGINE

[75] Inventors: Antoinette E. Weil, Cincinnati; Jon C. Schaeffer, Milford; Julia A. Fields, Cincinnati, all of Ohio

[73] Assignee: General Electric Company, Cincinnati, Ohio

[21] Appl. No.: 10,939

[22] Filed: Jan. 29, 1993

[51] Int. Cl.$^5$ ............................................. F02C 7/00
[52] U.S. Cl. ..................................... 60/39.06; 60/723
[58] Field of Search .................. 60/39.06, 39.5, 264, 60/723, 39.82.2, 204

[56] References Cited

U.S. PATENT DOCUMENTS

| | | | |
|---|---|---|---|
| 2,829,494 | 4/1958 | Christensen | 60/39.71 |
| 2,964,907 | 12/1960 | Toone | 60/723 |
| 3,032,991 | 5/1962 | Vdoviak | 60/39.82 |
| 3,113,885 | 12/1963 | Teague | 117/46 |
| 3,928,961 | 12/1975 | Pfefferle | 60/39.02 |
| 4,065,917 | 1/1978 | Pfefferle | 60/39.82 |
| 4,197,700 | 4/1980 | Jahnig | 60/723 |
| 4,337,028 | 6/1982 | Angwin et al. | 431/7 |
| 4,603,547 | 8/1986 | Pfefferle et al. | 60/39.02 |
| 4,811,555 | 3/1989 | Bell | 60/39.5 |
| 5,026,273 | 6/1991 | Cornelison | 431/170 |

Primary Examiner—Louis J. Casaregola
Attorney, Agent, or Firm—Jerome C. Squillaro; Carmen Santa Maria

[57] ABSTRACT

A catalyst-bearing component of a gas turbine engine is provided. Catalytic materials are provided on components defining the gas flow path of the engine, so that emissions of carbon monoxide and unburned hydrocarbons are reduced. The catalytic materials are selected from the group consisting of noble metals and transition metal oxides. The portions of the gas flow path where such materials are advantageously applied include the combustor, the turbine and the exhaust system. The catalytic coating is preferably applied in conjunction with a thermal barrier coating system interposed between a substrate component and the catalytic coating.

14 Claims, 4 Drawing Sheets

CATALYST-BEARING COMPONENT OF GAS TURBINE ENGINE

This invention relates to gas turbine engines, and in particular, to modifications of components of such engines to catalyze the combustion of fuel to reduce the emission of carbon monoxide and unburned hydrocarbons from such engines.

BACKGROUND OF THE INVENTION

In the compressor portion of an aircraft gas turbine engine, atmospheric air is compressed to 10-25 times atmospheric pressure, and adiabatically heated to 800°-1250° F. in the process. This heated and compressed air is directed into a combustor, where it is mixed with fuel. The fuel is ignited, and the combustion process heats the gases to very high temperatures, on the order of 3000° F. These hot gases pass through the turbine, where rotating turbine wheels extract energy to drive the fan and compressor of the engine, and the exhaust system, where the gases supply thrust to propel the aircraft. In idealized engine operation, under stoichiometric conditions, the combustion process would be complete, and only the carbon dioxide and water vapor produced in combustion, plus nitrogen and minor components of atmospheric air, would be exhausted to the atmosphere by the engine. In reality, significant amounts of carbon monoxide (CO) and unburned hydrocarbons (UHC) are discharged into the atmosphere, particularly when the engine is operated at low speed. Such emissions are undesirable, for they pollute the environment and they represent a waste of fuel.

Operating parameters vary widely during operation of an aircraft gas turbine engine, from idling to developing very high thrust for take-off and in-flight maneuvering. As a result of these and other situations, conditions in the combustor also vary widely, possibly resulting in flame instability or even flame-out. The latter term refers to quenching the flame in the combustor due to disruptions in the gas flow within the combustor. Designers of aircraft gas turbine engines have devoted considerable effort toward minimizing flame instability and/or the likelihood of flame-out, and combustors are typically designed to operate under conditions where flame-out is not likely. Relighting an engine after flame-out during flight is essential to continued engine operation, but it is not always easily achieved, and thus designers seek to avoid flame-out.

There are several approaches to controlling flame instability and flame-out, including the use of catalytic substances. For example, Christensen (U.S. Pat. No. 2,829,494) teaches the use of a catalytic target positioned within a combustor immediately downstream from the point where fuel is injected. Vdoviak (U.S. Pat. No. 3,032,991) teaches the use of a multi-layer pad of fine-wire catalytic screen to sustain combustion in an augmentor, or afterburner, attached to the downstream end of an aircraft gas turbine engine. Teague (U.S. Pat. No. 3,113,885) teaches the use of flame holders which are, in effect, probes coated with catalytic material that extend into the combustor. Pfefferle et al. (U.S. Pat. No. 4,603,547) teach the coating of portions of the upstream end of a combustor with a thermal barrier coating, to which a catalytic coating, preferably a noble metal, is applied. The disclosure of each of these patents is incorporated herein by reference. Another common approach to the problem is the widespread use of electrical igniters in combustors.

Certainly these approaches to the related problems of maintaining flame stability and preventing flame-out are important advances in the gas turbine engine art, but these teachings do not address another problem, namely, the emission of CO and UHC during operation of the engine. The need to reduce such emissions to prevent degradation of the environment, is apparent. The present invention is directed specifically to the reduction of such undesirable emissions.

Other uses of catalytic materials are illustrated in patents by Pfefferle and Angwin et al. In U.S. Pat. No. 3,928,961, Pfefferle teaches the use of an externally heated bed of catalytic material to start a thermal system such as a gas turbine engine, reducing the emission of CO and UHC during the starting process. In U.S. Pat. No. 4,065,917, Pfefferle teaches the use of a bed of catalytic material in a turbomachine to achieve adiabatic combustion at temperatures lower than typically encountered in such machines, thereby reducing emissions of oxides of nitrogen. Angwin et al. (U.S. Pat. No. 4,337,028) teach the use of monolithic ceramic materials containing catalytic materials mixed therein, specifically in contrast to the use of catalytic coatings. The disclosures of these patents are also incorporated herein by reference. However, these patents address other aspects of catalysts of combustion, that are distinct from the present invention.

It is an object of the present invention to provide means for reducing the emission of CO and UHC by a gas turbine engine.

It is also an object of the present invention to provide such means while, at the same time, increasing the efficiency of such an engine.

It is a further object of the present invention to provide such means without adversely affecting the flow of gases through the engine, such as by avoiding the use of beds, screens, honeycombs and the like, made of catalytic material, which may be used to accomplish some of the objects of the present invention, but which interfere with the flow of gases through the engine.

It is another object of the present invention to provide such means without appreciably increasing the weight of the engine; for the size and weight of catalytic converter beds represent a penalty that is generally deemed unacceptable on a airborne gas turbine engine.

It is yet another object of the present invention to provide such means in a way as to minimize the impact on the design of such gas turbine engines and fabrication of components therefor.

It is still another object of the present invention that reducing the emission of CO and UHC by a gas turbine engine may be achieved by retrofitting existing engines, such as by simply replacing components of these engines during routine maintenance work.

SUMMARY OF THE INVENTION

The present invention is directed toward reducing the emission by a gas turbine engine of undesirable air pollutants such as carbon monoxide (CO) and unburned hydrocarbons (UHC), while at the same time providing for improved fuel efficiency of that engine. To accomplish these and other objects recited above, selected internal surfaces within the engine are made of materials which catalyze the combustion of gas turbine engine fuels.

The path which air and hot gases follow through a gas turbine engine is termed the flow path. The flow path is defined by several surfaces, which together act to constrain the flow of the air and hot gases to achieve the proper operation of the engine. Those surfaces generally include fan, compressor and turbine airfoils, shrouds, combustors, guide vanes, and the like. However, the portion of the flow path upstream of the combustor is not relevant to the present discussion. The term flow path, as used herein, is limited to that portion of the flow path within the core of the engine from the combustor downstream through the exhaust system, which is taken to include an augmentor, if one is used. For the purposes of this invention, passages for cooling air and surfaces of accessory articles, such as instrumentation probes or catalytic converter beds, are not included in this definition of flow path.

In the present invention, selected portions of the flow path surface catalyze the combustion of gas turbine engine fuels. This may be accomplished by making components which define the flow path from materials which catalyze combustion, or by coating appropriate portions of such components with such materials. Some components which are particularly amenable to the present invention are: combustor liners, high pressure turbine nozzles, blades and shrouds and exhaust system parts, including augmentors in engines thus equipped.

In one form of the invention, a combustor liner made of a nickel-base superalloy is coated with a catalyst material. The catalyst may be a noble metal or a transition metal oxide. Either material may be applied on top of a thermal barrier coating system, of a type known to those skilled in the gas turbine art. The coating catalyzes the combustion of the gas turbine engine fuel, driving the combustion process further toward completion than would otherwise occur in a conventional combustor.

In another form of the invention, a similar coating is applied to flowpath surfaces of a high pressure turbine nozzle, or to the airfoil and platform surfaces of a high pressure turbine blade. Especially when used in conjunction with the aforementioned form of the invention, the combustion reactions are driven further toward completion.

In a third form of the invention, surfaces inside an exhaust system, and particularly inside an augmentor, such as flame holders or V-gutters, are coated with catalytic material, to catalyze combustion in the exhaust system section of the engine. In each of the aforementioned forms of the invention, the nature and placement of catalytic material are specifically selected to reduce emission of air pollutants from the engine. It is recognized that catalytic materials have been employed to improve flame stability and prevent flame-out, but it is contemplated that the present invention may be used either independently of, or in conjunction with, such known usage.

An approach to reducing exhaust emissions that is commonly used in the automotive industry, namely, placing a catalytic converter in the exhaust system downstream from the engine, is undesirable in an aircraft gas turbine engine for several reasons. First, the weight of a converter large enough to handle the large volume of hot gases would significantly decrease the ability of the aircraft to carry its payload. Second, the pressure drop in gases passing through such a converter results in a large and unacceptable drop in the performance of the engine. Third, even if complete combustion in such a converter could be achieved, the only useful work in propelling the plane would be minor increases in the volume and temperature of the gases exhausted from the engine. The approach of the present invention avoids these problems, and provides other useful improvements in the gas turbine art.

Other advantages, features and advantages of the present invention will become apparent from the following description, the appended claims and the accompanying drawings.

BRIEF DESCRIPTION OF THE DRAWINGS

FIG. 6 is a schematic representation of a catalytic coating applied over a thermal barrier coating system.

DETAILED DESCRIPTION OF THE INVENTION

In accordance with the present invention, components of a gas turbine engine which define the gas flow path thereof are coated with, or made from, substances which catalyze the combustion of fuel in the engine. The selection of catalytic materials and the placement thereof in the engine are specifically directed toward the reduction of emission of air pollutants such as CO and UHC by the engine. In the context of the present invention, the term UHC is taken to include hydrocarbons which have not burned at all, as well as hydrocarbons which have partially burned, but still retain some chemical characteristics of hydrocarbons.

Figure 1:
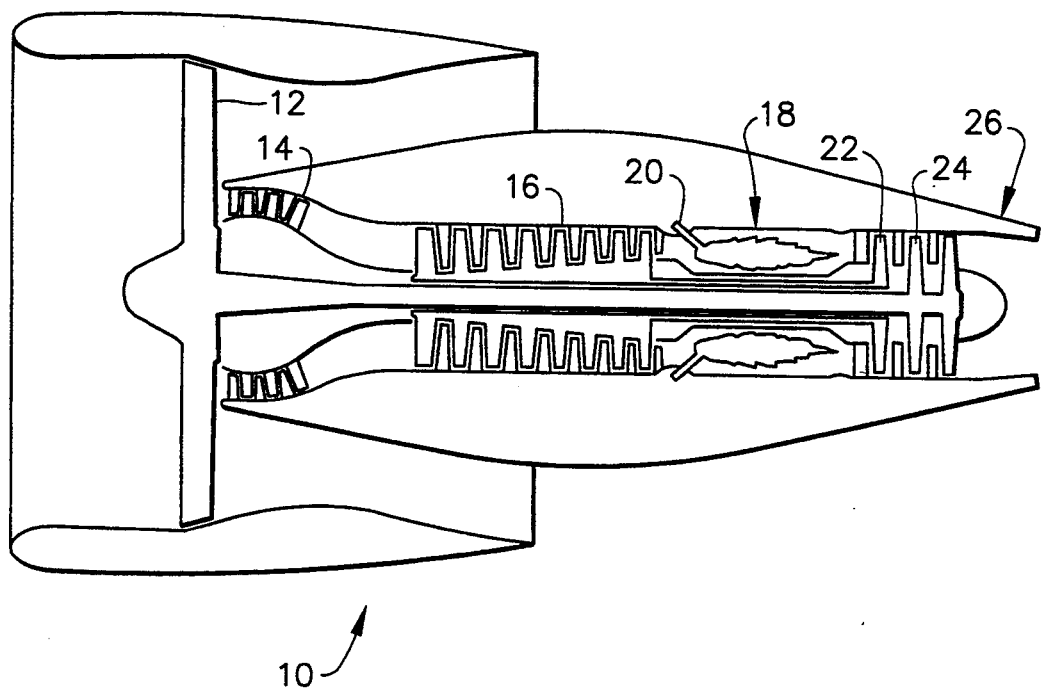
FIG. 1 is a schematic representation of a high bypass turbofan gas turbine engine.

A high bypass aircraft gas turbine engine 10 is shown schematically in FIG. 1. During operation, air is compressed in the fan 12, booster 14 and compressor 16 portions of the engine to 10–25 times atmospheric pressure, and adiabatically heated to 800°–1250° F. in the process. This heated and compressed air is directed into the combustor portion of the engine 18, where it is mixed with fuel supplied through a fuel nozzle system 20. The fuel is ignited, and the combustion process heats the gases to temperatures on the order of 3000° F. These hot gases pass through the high pressure 22 and low pressure 24 turbines, where rotating wheels extract energy to drive the fan and compressor of the engine, and the exhaust system, where the gases supply thrust to propel the aircraft.

Figure 2:
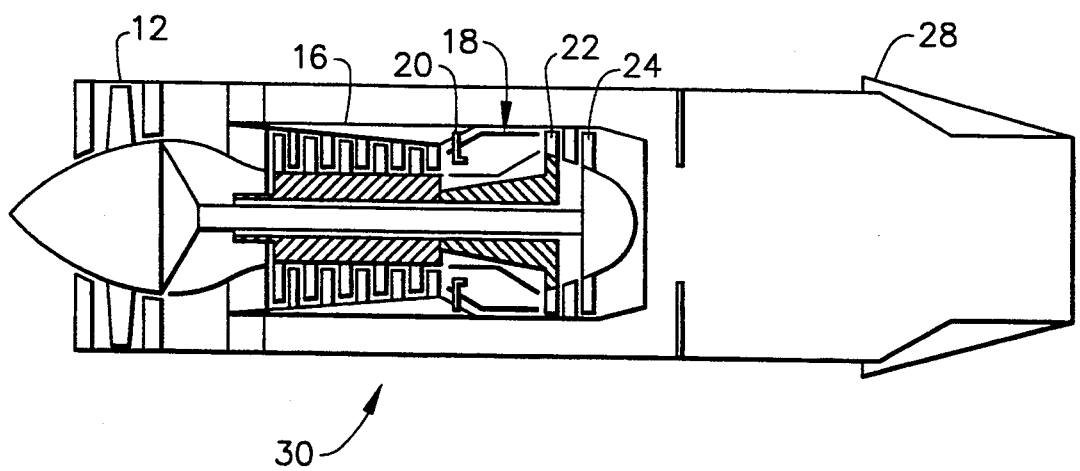
FIG. 2 is a schematic representation of a low bypass turbofan gas turbine engine equipped with an augmentor.

Operation of a low bypass gas turbine engine, shown schematically at 30 in FIG. 2, is similar, except that operational requirements may dictate omission of the booster 14 and substitution of an augmentor 28 for the exhaust system shown at 26 in FIG. 1. To emphasize the conceptual similarity, the same identification numerals are employed in both Figures.

Figure 3:
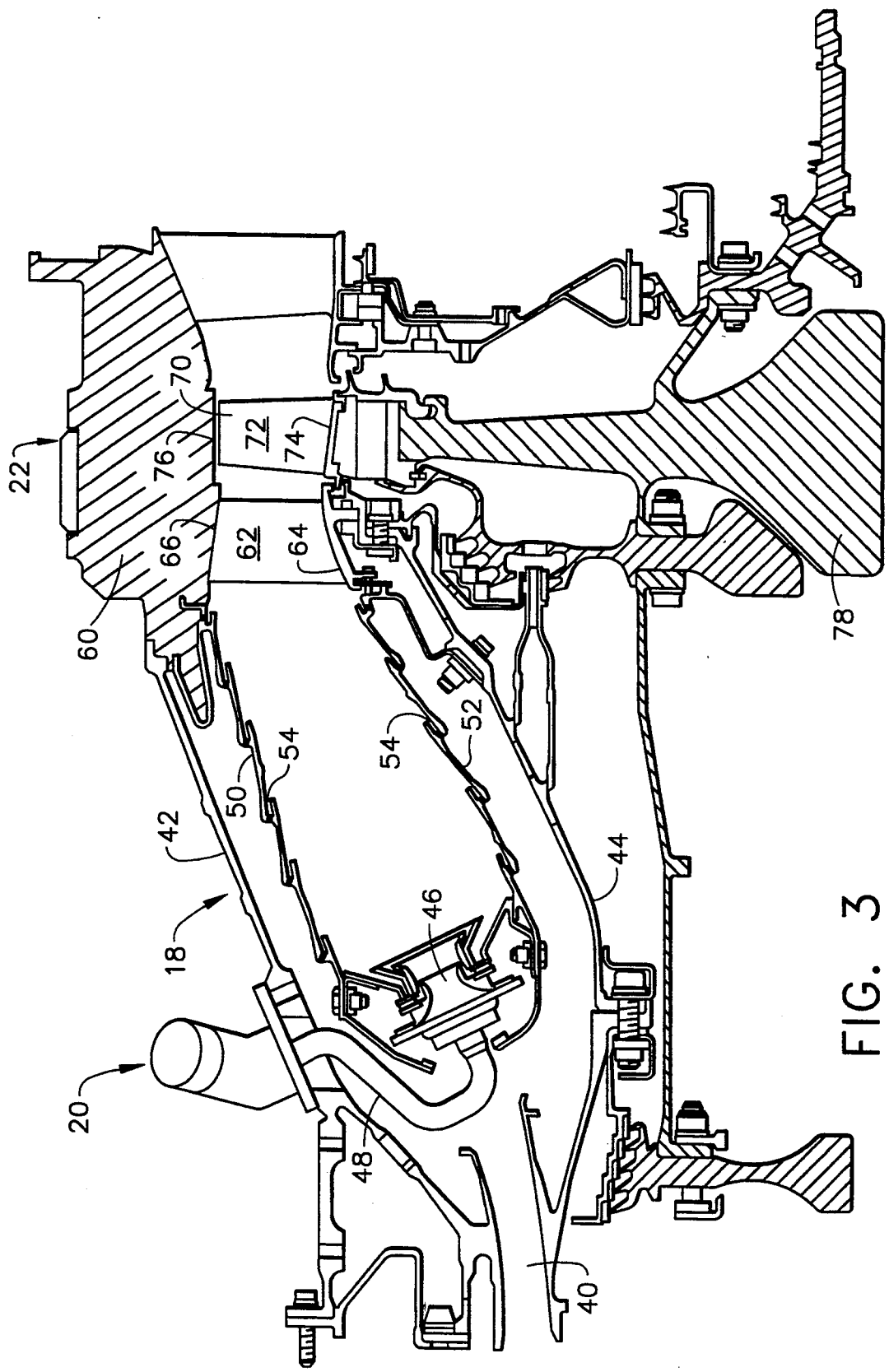
FIG. 3 is a schematic representation of the combustor section of a gas turbine engine.

The combustor 18 and high pressure turbine 22 sections of an engine such as in FIG. 1 or FIG. 2 are shown in greater detail in FIG. 3. In this discussion, the combustor is presumed to be of annular configuration, as is common in the gas turbine art, but the concepts of the present invention are fully applicable to combustors of other configurations and designs. Compressed air from the compressor is introduced through a diffuser 40 into an annular cavity defined by the combustor case 42 and the inner combustor case 44. A portion of the compressed air passes through a swirl nozzle 46, where it is mixed with fuel supplied through a fuel tube 48. The swirl nozzle and fuel tube are components of the fuel nozzle system 20. The fuel/air mixture is self-igniting under normal operating conditions, save those transient conditions where flame instability or flame-out occurs. The flame is confined and directed toward the turbine by the outer combustor liner 50 and the inner combustor liner 52. Each combustor liner is provided with numerous cooling holes 54, through which the remainder of the compressed air supplied by the compressor is forced to pass. The combustor liners 50 and 52 are described as having an inner side, facing the flame and swirl nozzle, and an outer side, directly facing the combustor case and inner combustor case. As the temperature of the hot gas between the two combustor liners can easily exceed 2400° F., it is necessary to cool the liners, first by passing the air coming from the compressor (at about 1000°–1250° F.) over the outer surfaces of the two liners, then by using the same air after it passes through the cooling holes 54 to create a film of air between the inner surfaces of the liners and the flame. While that film of air is necessary to protect the combustor liners, it is thought to contribute to the emission of CO and UHC by the engine.

The hot gases then leave the combustor and enter the high pressure turbine 22, which may comprise a single stage, as shown in FIG. 3, or multiple stages; each stage is comprised of a nozzle 60 and a rotor 70. The nozzle 60 is comprised of a plurality of vanes 62 disposed between and secured to an inner band 64 and an outer band 66. The vanes are stationary. The rotor 70 is comprised of a plurality of blades, each having an airfoil section 72 and a platform 74, which are attached to the periphery of a rotating disk 78. Appurtenant structures to support the rotor are not shown. The blades cooperate with a stationary shroud 76 to effect a gas seal between the rotor and the stationary components of the engine. The gas flow path in this portion of the engine is defined upstream of the swirl nozzle 46 by the diffuser 40, the combustor case 42 and the inner combustor case 44. Downstream of the fuel nozzle 46, the gas flow path is defined by the inner surfaces of the inner combustor liner 52 and the outer combustor liner 50, and portions of the turbine or turbines including the inner and outer bands 64 and 66, the vanes 62, the airfoil 72 and platform 74 portions of the blades, the shrouds 76, as well as the exhaust system 26 and/or augmentor 28. The present invention is specifically applicable to those components which define the gas flow path downstream of the swirl nozzle 46.

Components of at least one turbine stage are often provided with cooling air through cooling holes, in the same manner as the combustor liners. Additionally, the components exposed to hot gas downstream of the combustor may be provided with thermal barrier coating systems on their respective flow path surfaces. Systems for providing cooling air and thermal barrier coating systems are known in the gas turbine engine art.

Materials employed in the combustor, turbine and exhaust system sections of aircraft gas turbines are typically superalloys based on nickel, cobalt, iron or combinations thereof. All of these superalloys are believed to be suitable substrate materials for the present invention. Also, monolithic ceramic materials and fiber reinforced ceramic matrix composite materials, described herein collectively as ceramic materials, may be employed in the combustor, turbine and exhaust systems sections of an aircraft gas turbine. Such ceramic materials are specifically included in the present invention, either as substrates for a catalytic coating, or uncoated, where the ceramic material itself provides effective catalysts for combustion of hydrocarbons.

Even for gas turbine engines designed for commercial airliners, gas velocity through the engine may approach the speed of sound. Thus, the total gas residence time in the engine is but a small fraction of a second, during which air coming through the compressor must be mixed with liquid fuel, and combustion of the mixture must occur. In actuality, complete combustion within the engine does not occur, even though excess air is normally supplied; some unburned or partially burned fuel is typically discharged from the engine, resulting in undesirable air pollution. There is existing theory that cooling flowpath surfaces, both by film cooling and by cooling the material defining the flow path from the reverse side, exacerbates the pollution problem. CO and UHC are the major constituents of such pollution. Notwithstanding the correctness of this theory, emission of CO and UHC is a particularly severe problem at low engine operating speeds, or at idle conditions. Emissions of oxides of nitrogen (sometimes identified as NOx) are not addressed in this discussion, nor by the present invention.

The present invention is directed toward reducing such emissions of CO and UHC. As such, the selection of catalytic substances, and the specific placement of such substances in the engine are made toward achieving that object. Further, the present invention is directed toward maintaining or improving the operational behavior and efficiency of the engine. Therein lies an important distinction over prior art teachings of other uses of catalysts in gas turbine engines.

Catalytic devices heretofore employed in the combustors of gas turbine engines have been directed toward maintaining flame stability and preventing flame-out. Many such devices have a severe disadvantage, in that the free flow of gases through the engine is impeded, and energy which might otherwise contribute to the efficient operation of the engine is wasted in turbulence and/or pressure drop associated with the catalytic device. Thus, in the present invention catalytic material is applied solely to those surfaces in the gas turbine engine already incorporated into its design to define the gas flow path. Such surfaces include the inner surfaces of the outer and inner combustor liners, 50 and 52 respectively, the vanes 60 and the inner and outer bands of the turbine nozzle, 64 and 66 respectively, and the blade airfoils 72 and platforms 74, and other surfaces along the gas flow path, as may be appropriate. It is recognized in the present invention that it may be impractical to apply catalytic material to the entirety of the gas flow path surfaces of such components, and thus the present invention includes applying catalytic material to whatever portions of the surfaces of such components as may be practical, or necessary to achieve reduction of CO and UHC emissions, and not necessarily over the entire gas flow path surfaces.

Research leading to the present invention has demonstrated the value of even small amounts of catalytic material in the gas flow path in close proximity to the point where fuel is introduced into the compressed air in reducing emissions of CO and UHC. Thus it has been discovered that prior an catalytic devices used to achieve flame stability may provide some reduction in CO and UHC emissions, even though this benefit was not previously recognized, probably because the overall reduction was small compared to the total emissions. Because this benefit was not recognized, the desirability of coating portions of the gas flow path surfaces in the downstream portion of the combustor and in the turbine was not recognized. Thus, the placing of catalytic material over significant portions of the gas flow path surface in the combustor and turbine sections of the engine is regarded as an important aspect of the present invention in reducing the overall emissions.

Many different substances that catalyze the combustion of hydrocarbon fuels are known. For example, noble metals such as platinum and palladium are known to be effective catalysts. Also, certain transition metals and their oxides are known to be effective catalysts. In particular, nickel oxide, chromium oxide and manganese oxide are known to be effective catalysts. Research leading to the present invention indicated that cobalt oxide is not effective as a catalyst, and thus it is excluded from the group of materials identified as transition metal oxides. While an appropriate catalytic material is an essential element of the present invention, the choice of a particular catalytic material is not to be considered as limiting on the present invention. That choice may be influenced by other factors relating to the overall design of the engine, and by the need for compatibility between the catalytic material and the underlying substrate material.

One such factor could be the presence of a thermal barrier coating system (TBC) on one or more gas flow path components to protect the substrate, typically metallic, but which may be a composite material such as metal matrix or ceramic matrix composite, or a ceramic, against high gas temperatures. Such TBCs frequently include a layer of zirconia stabilized with about 6 to 20 percent by weight yttria. In this situation, a transition metal oxide catalytic coating overlying the TBC is considered preferable. Such a combination of a catalytic coating applied over a TBC is illustrated in FIG. 6. In the context of the present invention, the term substrate refers to a structure that provides mechanical and structural integrity to the component, while the terms coating and coating system refer to one or more layers of other materials applied sequentially to the surface of the substrate to confer some particular attribute thereto. For example, one type of coating system contemplated in the present invention includes a layer of a metallic bond coat, which serves to secure a subsequently applied ceramic layer to the substrate and protect the substrate against oxidation, a layer of ceramic thermal barrier coating, which reduces the flow of heat from hot gases passing through the engine to the substrate, and a layer of catalytic material, which promotes completion of the combustion process. Thus, as none of the layers of this coating system provide any significant contribution to the mechanical and structural integrity of the component, it is not appropriate to consider any of these layers as part of the substrate.

Figure 4:
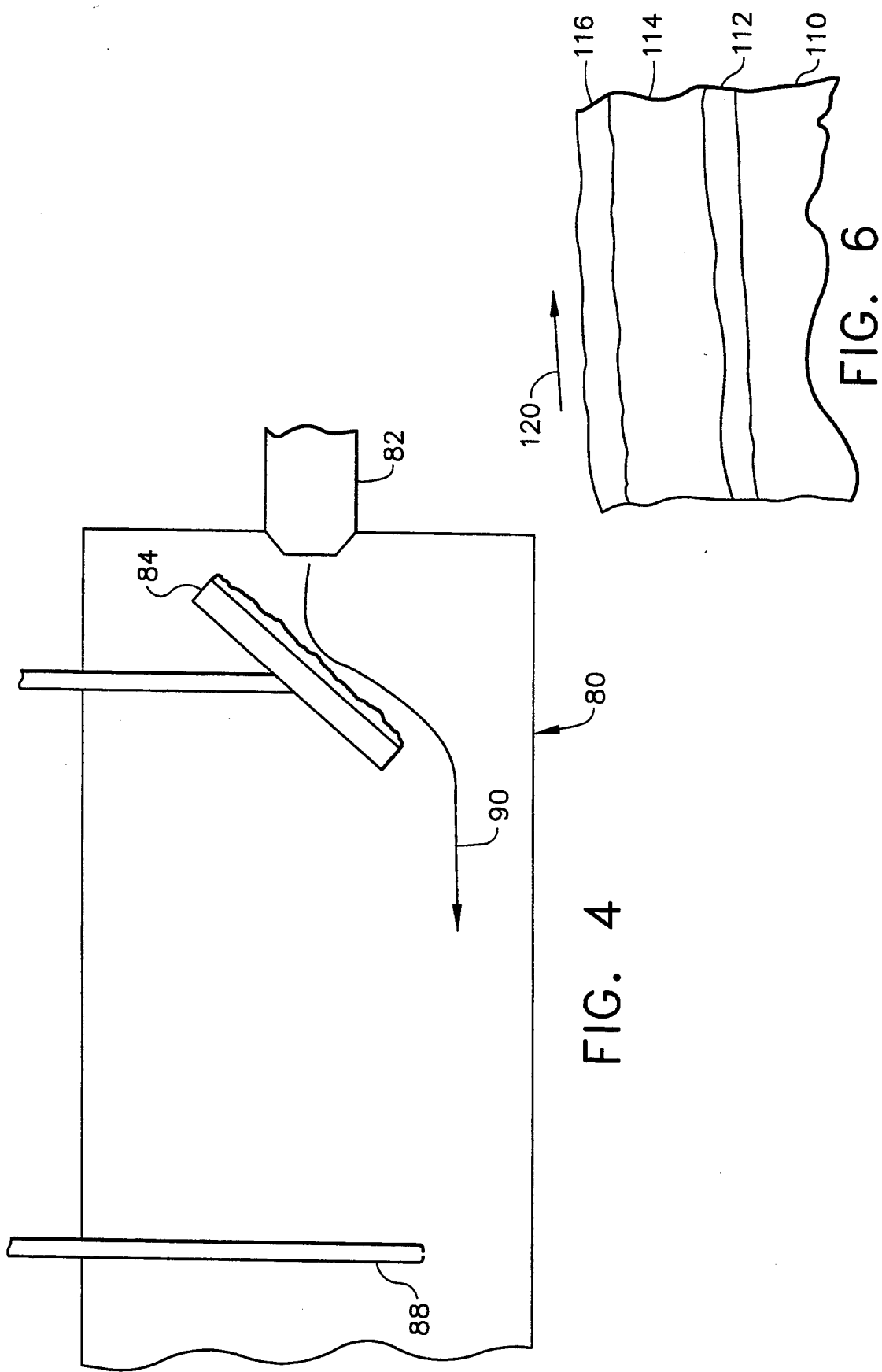
FIG. 4 is a schematic representation of the test apparatus used for measuring the effectiveness of catalytic coatings in reducing emission of air pollutants.

The usefulness of catalytic coatings of the present invention was demonstrated in the test apparatus shown in FIG. 4. The apparatus comprised a test chamber 80, a gas burner 82 at one end thereof, a test coupon 84 comprising a superalloy substrate and a coating applied thereto positioned in front of the gas burner, a gas collection probe 88 and a gas analyzer (not shown). The gas flow path in the test apparatus is shown at 90. The test coupon 84 was approximately 2 × 2 inches in size. The gas burner 80 was adjusted to provide a range of fuel-to-air ratios. The fuel-to-air ratio is characterized by an equivalence ratio, which is the ratio of the amount of fuel provided to the burner to the amount of fuel required for stoichiometric combustion. Thus, an equivalence ratio of 1.0 represents stoichiometric combustion, and equivalence ratios less than 1.0 represent lean combustion, or combustion with excess air present.

Figure 5:
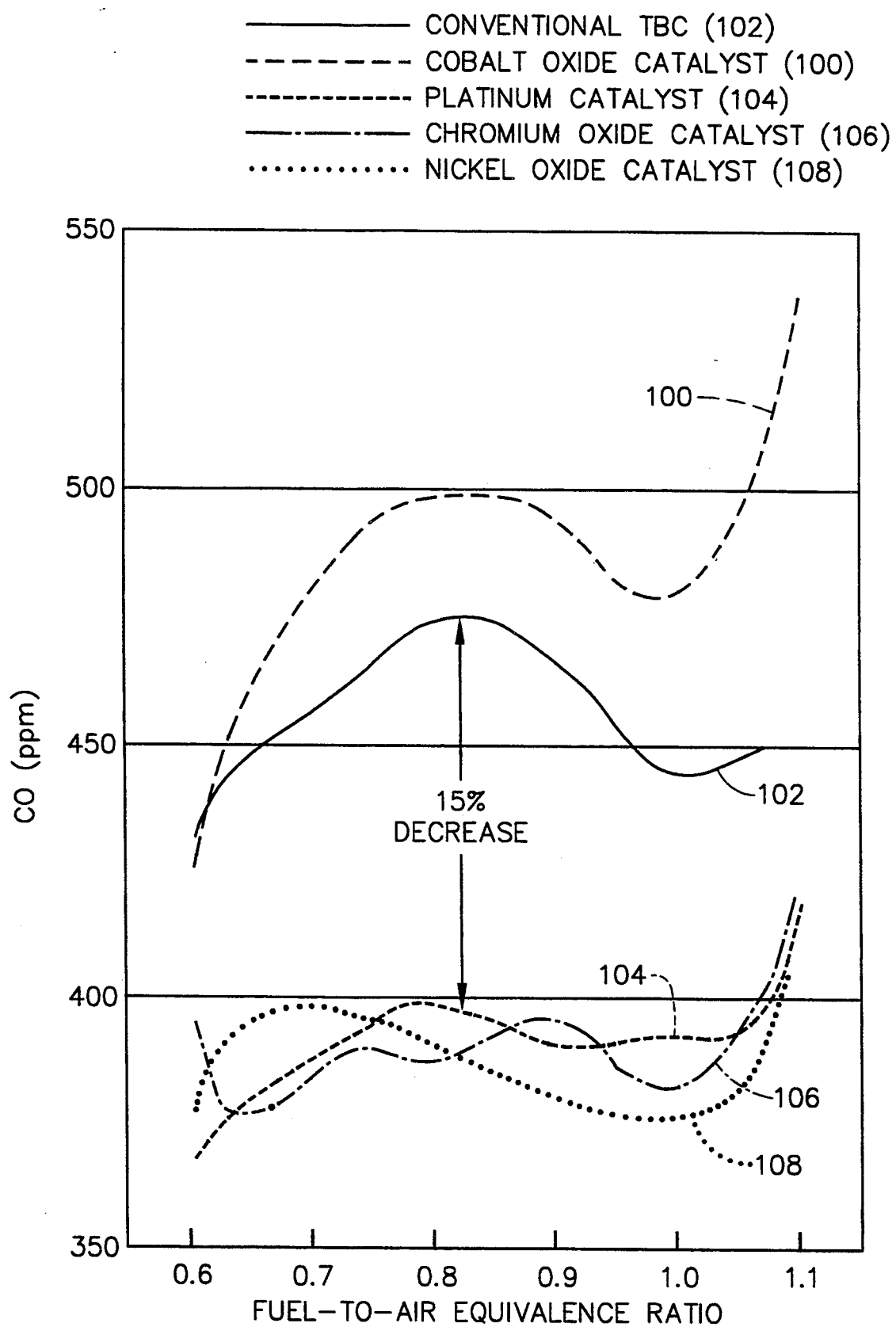
FIG. 5 illustrates the reduction in carbon monoxide produced in experiments relating to the present invention, using the apparatus shown in FIG. 4.

FIG. 5 illustrates the results of tests of several different catalytic coating materials, related to a representative baseline material. Curve 102 illustrates the concentration of CO present at the gas collection probe 88 when a conventional TBC consisting of zirconia stabilized with about 8 weight percent yttria was applied to the substrate. Curves 104, 106 and 108 illustrate the concentration of CO present when the conventional TBC was overlaid with catalytic coatings of metallic platinum, chromium oxide and nickel oxide, respectively. Curve 100 illustrates the concentration of CO present at the gas collection probe 88 when the conventional TBC was overlaid with cobalt oxide, which was judged to be ineffective in the context of the present invention. Reductions in CO concentration on the order of 15 percent were obtained with the three catalytic coatings, relative to the TBC coating. For these tests, the metallic platinum coating was applied by sputtering; the chromium oxide, nickel oxide and cobalt oxide coatings were applied by plasma spray.

While this test apparatus was useful in comparing the relative effectiveness of different catalytic materials, it does not indicate the maximum extent to which CO concentration can be reduced in a gas turbine engine. It is expected that further reductions in CO (and UHC) emissions could be obtained by coating a larger surface area within the gas flow path of an engine with catalytic material, and selecting the most appropriate sections of the flow path for coating.

The present invention contemplates that catalytic materials may be applied to any gas flow path surface downstream from the combustor nozzle in a gas turbine engine, including additional high pressure turbine components, low pressure turbine components, ducts therebetween, and exhaust system and/or augmentor components. The catalytic materials may be applied as coatings over whatever substrate materials are chosen for such components, or the entire component may be made of a catalytic material. Also, a catalytic coating may be applied over a TBC, or the ceramic layer in a TBC may be made of a catalytic material. The present invention also contemplates the use of catalytic materials of the present invention in conjunction with various devices for flame stabilization, even though flame stabilization is distinct from reduction of emissions.

By providing catalytic surfaces on components of gas turbine engines, as opposed to adding new components, the present invention achieves several objects of the present invention. There is little or no modification to the configuration of the flow path surface, and, therefore, little or no change to gas flow through the engine. There are no bulky and heavy converter beds. The weight increase associated with the present invention is negligible. Components with catalytic surfaces simply replace prior art components without catalytic surfaces, to retrofit prior art gas turbine engines.

In applying the principles of the present invention there are three critical factors which must be considered: (1) the catalytic material employed in the engine, and the methods employed for installing such material, must not adversely affect the performance of other components of the engine; (2) the catalytic material must provide that function; and (3) the catalytic material must adhere tenaciously to its underlying substrate. Otherwise, there is enormous flexibility available to one using this invention, in the selection of materials and in the selection of specific locations within the engine where catalytic material is to be installed. Likewise, there is great flexibility in how catalytic materials may be installed in the engine; any operable method, including thermal spray or vapor deposition (either physical vapor deposition or chemical vapor deposition), may be used.

The presently preferred form of the present invention is illustrated in FIG. 6. Numeral 110 represents a substrate, a surface portion of a gas turbine engine component defining the gas flow path. In modern gas turbine engines, such components are typically made from nickel-base superalloys. A thermal barrier coating system, of a type known in the art, comprises a bond coat 112 and a ceramic layer 114. The bond coat may be of the MCrAlY type known in the art, or a modification thereof, about 0.003 inch thick. The ceramic layer is preferably zirconia containing about 8 percent yttria, and may be 0.005 to 0.050 inch thick, depending on design requirements for the component. Both coats may be applied by plasma spray. A catalytic layer 116 is preferably a transition metal oxide, such as nickel oxide, about 0.001–0.010 inch thick, and preferably about 0.002 inch thick. It is preferably applied by plasma spray. A flow of hot gas 120 continually passes over the component during engine operation. Although flow path surfaces are typically made as smooth as practicable to enhance aerodynamic performance of the engine, catalytic action is improved by making the catalytic layer 116 somewhat porous, on the order of 70–9.0 percent of the theoretical density of the catalytic material, and the surface of the catalytic layer is somewhat rough, on the order of 100–250 microinches arithmetic average. It is contemplated that the extent of porosity and surface finish of the catalytic layer will necessarily be optimized for each application. This form of the present invention is preferred because of its excellent adhesion to metallic substrates, and its effectiveness in reducing emissions of CO and UHC.

While the foregoing embodiments are considered to be preferred, it is understood that numerous variations and modifications may be made therein by those skilled in the art, and it is intended to cover in the appended claims such variations and modifications as fall within the true spirit and scope of the invention.

We claim:

1. An axial flow gas turbine engine having a compressor portion, a combustor portion, a turbine portion and an exhaust portion, in which fuel is solely supplied to a combustor portion of the engine where it is ignited to form a hot gas, the ignited gas passing through at least one turbine stage intermediate between the combustor portion and the exhaust portion, the improvement comprising:

a component having a surface thereof that defines at least a portion of a gas flow path in the engine downstream from the combustor portion through the exhaust portion; and a catalytic coating, applied to at least a sufficient portion of the surface, that catalyzes the combustion of gas turbine engine fuels to reduce emission of unburned hydrocarbons and carbon monoxide by at least 15% at a fuel to air equivalence ratio of 0.8.

2. The component of claim 1, wherein the component is a part of a turbine of the gas turbine engine.

3. The component of claim 1, wherein the component is a part of an exhaust system of the gas turbine engine.

4. The component of claim 1, wherein the catalytic coating is comprised of a material selected from the group consisting of noble metals and transition metal oxides.

5. The component of claim 1, wherein the component is comprised of a superalloy.

6. The component of claim 1, wherein the component is comprised of a superalloy material coated with a ceramic thermal barrier coating, and wherein the catalytic coating is applied to the thermal barrier coating so that the thermal barrier coating is interposed between the catalytic coating and the superalloy material.

7. The component of claim 6, wherein the thermal barrier coating system includes a layer of yttria-stabilized zirconia which contains between 8 and 20 percent yttria by weight.

8. The component of claim 6, wherein the component is a part of a turbine of the gas turbine engine.

9. The component of claim 6, wherein the component is a part of an exhaust system of the gas turbine engine.

10. The component of claim 1, wherein the component is comprised of a ceramic material.

11. The method of claim 8 wherein the material that catalyzes combustion is applied to the portion of the flow path surface by a process selected from the group consisting of thermal spray and vapor deposition.

12. The component of claim 1, wherein the surface roughness of the catalytic coating is between about 100 and about 250 microinches arithmetic average.

13. The component of claim 4 wherein the catalytic coating has a density between about 70 and about 90 percent of its theoretical density.

14. A method for reducing emissions of unburned hydrocarbons and carbon monoxide from an axial gas turbine engine which includes a compressor portion, a combustor portion, a turbine portion and an exhaust portion, in which fuel is solely supplied to a combustor portion of the engine where it is ignited to form a hot gas, the ignited gas passing through at least one turbine stage intermediate between the combustor portion and the exhaust portion and having a flow path surface from the combustor portion downstream through the exhaust portion, the method comprising fabrication of at least a sufficient portion of the flow path surface with a material that catalyzes combustion of gas turbine engine fuels to reduce emission of unburned hydrocarbons and carbon monoxide by at least 15% at a fuel to air equivalence ratio of 0.8.

* * * * *